(12) United States Patent
Tutelea et al.

(10) Patent No.: US 10,604,047 B2
(45) Date of Patent: Mar. 31, 2020

(54) ARM REST ARRANGEMENT FOR A MOTOR VEHICLE SEAT

(71) Applicant: BOS GMBH & CO. KG, Ostfildern (DE)

(72) Inventors: Bogdan Tutelea, Leichlingen (DE); Wolfgang Sitzler, Wuppertal (DE); Tanja Pink, Wuppertal (DE); Andreas Göbbels, Kürten (DE); Hartmut Bohlke, Wuppertal (DE); Jan Boddenberg, Köln (DE)

(73) Assignee: BOS GMBH & CO. KG, Ostfildern (DE)

( * ) Notice: Subject to any disclaimer, the term of this patent is extended or adjusted under 35 U.S.C. 154(b) by 0 days.

(21) Appl. No.: 16/073,442

(22) PCT Filed: Jan. 9, 2017

(86) PCT No.: PCT/EP2017/050334
§ 371 (c)(1),
(2) Date: Jul. 27, 2018

(87) PCT Pub. No.: WO2017/129388
PCT Pub. Date: Aug. 3, 2017

(65) Prior Publication Data
US 2019/0001852 A1 Jan. 3, 2019

(30) Foreign Application Priority Data

Jan. 29, 2016 (DE) .......................... 10 2016 000 904
Oct. 19, 2016 (DE) .......................... 10 2016 220 501

(51) Int. Cl.
*B60N 2/70* (2006.01)
*B60N 2/75* (2018.01)

(52) U.S. Cl.
CPC ............. *B60N 2/767* (2018.02); *B60N 2/753* (2018.02)

(58) Field of Classification Search
CPC ................................ B60N 2/767; B60N 2/753
USPC ....................................................... 297/411.32
See application file for complete search history.

(56) References Cited

U.S. PATENT DOCUMENTS 5,778,733 A 7/1998 Stringer
5,984,416 A * 11/1999 Waldo ...................... A47C 1/03
297/411.38

(Continued)

FOREIGN PATENT DOCUMENTS

DE     69 39 112 U     3/1974
DE     92 11 290 U1    12/1992

(Continued)

OTHER PUBLICATIONS

International Search Report issued in Application No. PCT/EP2017/050334 with English translation dated Mar. 30, 2017 (5 pages).

(Continued)

*Primary Examiner* — Mark R Wendell
(74) *Attorney, Agent, or Firm* — Flynn Thiel, P.C.

(57) ABSTRACT

An arm rest arrangement for a motor vehicle seat with a fixed carrier structure and an arm rest body mounted for pivoting about an axis in relation thereto, and with which an incline adjustment device is associated, allowing a modification of an incline of the arm rest body in relation to the carrier structure. The incline adjustment device includes an actuating member and a blocking device for securing an incline adjustment carried out by the actuating member. The arm rest body include a supporting member adjustable in a linearly movable manner on the arm rest body and supported on the carrier structure. The actuating member and the blocking device are connected to the supporting member (Continued)

such that same can be released by the actuating member for a linear adjustment and can be stopped by the blocking device in an adjusted supporting position.

19 Claims, 5 Drawing Sheets

(56) References Cited

U.S. PATENT DOCUMENTS

| | | | |
|---|---|---|---|
| 8,132,861 B2* | 3/2012 | Cone | B60N 2/753 297/411.32 |
| 9,481,275 B2 | 11/2016 | Bohlke et al. | |
| 2003/0075394 A1* | 4/2003 | Shields | B60N 2/23 188/67 |
| 2008/0296954 A1 | 12/2008 | Liu et al. | |

FOREIGN PATENT DOCUMENTS

| | | |
|---|---|---|
| DE | 10 2008 050 953 A1 | 4/2010 |
| DE | 10 2014 210 134 A1 | 12/2015 |
| DE | 10 2015 117 049 A1 | 4/2017 |
| FR | 2 734 769 A1 | 12/1996 |
| JP | S 61-52955 U | 4/1986 |

OTHER PUBLICATIONS

Written Opinion of International Searching Authority issued in Application No. PCT/EP2017/050334 dated Mar. 30, 2017 (6 pages).

Office Action of German Patent Office issued in German Application No. 10 2016 220 501.3 dated Sep. 11, 2017 (4 pages).

\* cited by examiner

ARM REST ARRANGEMENT FOR A MOTOR VEHICLE SEAT

TECHNICAL FIELD

The invention relates to an armrest arrangement for a motor vehicle seat, having a positionally fixed carrier structure and having an armrest body which is mounted so as to be pivotable relative to the carrier structure about a pivot axle and which is assigned an inclination adjustment unit which, in a functional position of the armrest body, permits a variation of an inclination of the armrest body relative to the positionally fixed carrier structure, wherein the inclination adjustment device has a manually operable actuating element and has a blocking device for securing an inclination setting performed by means of the actuating element.

BACKGROUND

An armrest device of said type is known from the laid-open specification DE 10 2014 210 134 A1. The known armrest device has an armrest part which is pivotable about a pivot axle between an armrest position and a non-use position. The pivot axle is divided into a base axle section, which is arranged so as to be stationary relative to a base part, and an armrest axle section, which is connected rotationally conjointly to the armrest part. A blocking device in the form of a wrap brake connects the two axle sections in a blocked state of the wrap spring. If the blocking device is released, then a pivoting of the armrest axle section relative to the base axle section is permitted. The armrest part can thus be pivoted relative to the base part and fixed in a desired pivoting position with blocking of the wrap brake. In this way, an adjustment of an inclination of the armrest part is possible. Furthermore, a pivoting between the armrest position and the non-use position is possible when the wrap brake is blocked.

It is an object of the invention to provide an armrest arrangement of the type mentioned in the introduction which permits a simple inclination adjustment.

Said object is achieved in that the armrest body has a support element which is adjustable in linearly movable fashion transversely with respect to the pivot axle on the armrest body and which is supported at an end side on the positionally fixed carrier structure, and in that the actuating element and the blocking device are operatively connected to the linearly movable support element such that the support element can, by means of the actuating element, be released for a linear adjustment and, by means of the blocking device, be locked in a set support position. Thus, a continuously variable inclination adjustment of the armrest body relative to the carrier structure is possible. The inclination adjustment device is integrated in the armrest body, such that, the region of the pivot axle can be of space-saving design.

In a refinement of the invention, the support element is held in positively locking fashion in an adjustment direction by means of a guide fixed to the armrest body. For this purpose, the support element may have a thread or a toothing. The armrest body may have a complementary thread or a complementary toothing which can be placed in engagement with the thread or the toothing of the support element in order to block the latter thread or toothing. The support element may for example be a toothed rack or a threaded spindle. On the armrest body, there may be arranged a rotating toothed wheel or a static spindle nut. An engagement of a rotationally fixedly arranged toothed element into the toothed rack may also be provided for the purposes of blocking the support element. Here, a length section of the support element between a positionally fixed support point of the support element on the carrier structure and the guide defines the inclination setting of the armrest body. If the length section is set to be relatively short, then the armrest body assumes a position with a relatively small angle between the armrest body and seat surface. If the length section of the support element between a support point of the carrier structure and the guide is set to be relatively long, then the armrest body is situated in a position with a relatively large angle between the seat surface and the armrest body.

In a further refinement of the invention, the support element is loaded in at least one adjustment direction by a drive. Said drive may be electrical, pneumatic, hydraulic or mechanical. Thus, when the blocking element is released, the support element can be displaced in at least one direction by the drive and, when the blocking element is blocked, the support element can be fixed in said position. The drive can displace the armrest body selectively in two directions or only in one direction. It is thus possible for the armrest body to be pivoted about a positionally fixed pivot axle by means of the drive in order to increase or decrease an angle between a seat surface and the armrest body. Alternatively, the drive may be provided only for increasing the angle between seat surface and armrest body when the blocking element is released. Provision may furthermore be made for an inherent weight of a user's arm resting on the armrest body to be utilized to decrease the angle between armrest body and seat surface when the blocking element is released.

In a further refinement of the invention, the drive is designed as a mechanical spring drive. The spring drive is advantageously preloaded during a user-actuated adjustment movement of the armrest body. A spring energy of the preloaded spring can be utilized to displace the armrest body when the blocking element is released, or to assist a displacement of the armrest body. The mechanical spring drive may in this case have a spiral spring or a torsion spring or helical spring, and act on the support element or on the armrest body. If the support element has a toothed rack, it is advantageously possible for a compression spring, in particular in the form of a helical spring, to act as a drive on the toothed rack in order to displace the latter. If the support element has a threaded spindle, it is advantageously possible for a torsion spring to act as a drive on the threaded spindle. If the support element interacts with a toothed wheel, a spiral spring may be provided as a drive which drives the toothed wheel.

In a further refinement of the invention, the support element is held by means of a movement thread in the guide fixed to the armrest body. The movement thread does not exhibit a self-locking action, such that a displacement of the support element is possible during the adjustment movement of the armrest body. During a linear displacement of, or an introduction of force into, the armrest body, it is thus possible, when the blocking element is released, for the support element to be set in rotation.

In a further refinement of the invention, the spring drive has a torsion spring which is arranged coaxially with respect to the movement thread and which is supported at one side on the support element and at the other side on the guide. The torsion spring advantageously acts as a spring drive which is placed under stress during an adjustment movement of the armrest body in a first direction and is relieved of stress in a second direction. Thus, the armrest body is displaced by a user in a first direction and the torsion spring is placed under stress during a displacement. The armrest body can be reset in a second direction by the prestressed torsion spring. The torsion spring interacts with the support element which is linearly movable by means of a screw thread movement, by virtue of the torsion spring subjecting the support element to a torque about its longitudinal axis, which torque leads to a screwing movement of the support element relative to the guide in the armrest body and accordingly to the linear movement.

In a further refinement of the invention, the blocking device has a wrap brake oriented coaxially with respect to the support element. The wrap brake blocks a rotation and/or a linear displacement of the support element. The support element can perform a linear movement and a linear and/or a rotational movement. It is possible in particular for a threaded rod or an exclusively linearly displaceable toothed rack to be provided as a support element. It is also possible for a unipartite or multi-part support element to be provided which, in regions, performs a rotation and a linear movement.

In a further refinement of the invention, the actuating element is coupled by means of a remote transmission device to the blocking device. The remote transmission may be mechanical, electrical, pneumatic or hydraulic. The actuating element is advantageously arranged in a region in which it can be easily gripped and operated by a user, advantageously on an underside of the armrest body in a region averted from a connecting region of the armrest body and a backrest. Said region preferably corresponds to a position of a hand of an operating person when the arm of the operating person is resting on the armrest body. The actuating element is accordingly positioned in an ergonomically expedient manner. The remote transmission device advantageously produces the connection between the actuating element and the blocking device, wherein the blocking device therefore does not need to be arranged in a region in which it can be gripped by a user, but rather can be arranged in a space-saving manner in terms of construction. The remote actuating device may have a pulling and/or pushing means, in particular a cable pull arrangement or a transmission linkage.

Further features and advantages of the invention will emerge from the claims and from the following descriptions of preferred embodiments of the invention in conjunction with the drawings. Individual features of the described or illustrated embodiments may in this case be combined with one another in any desired manner without departing from the scope of the invention.

DETAILED DESCRIPTION

Figure 1:
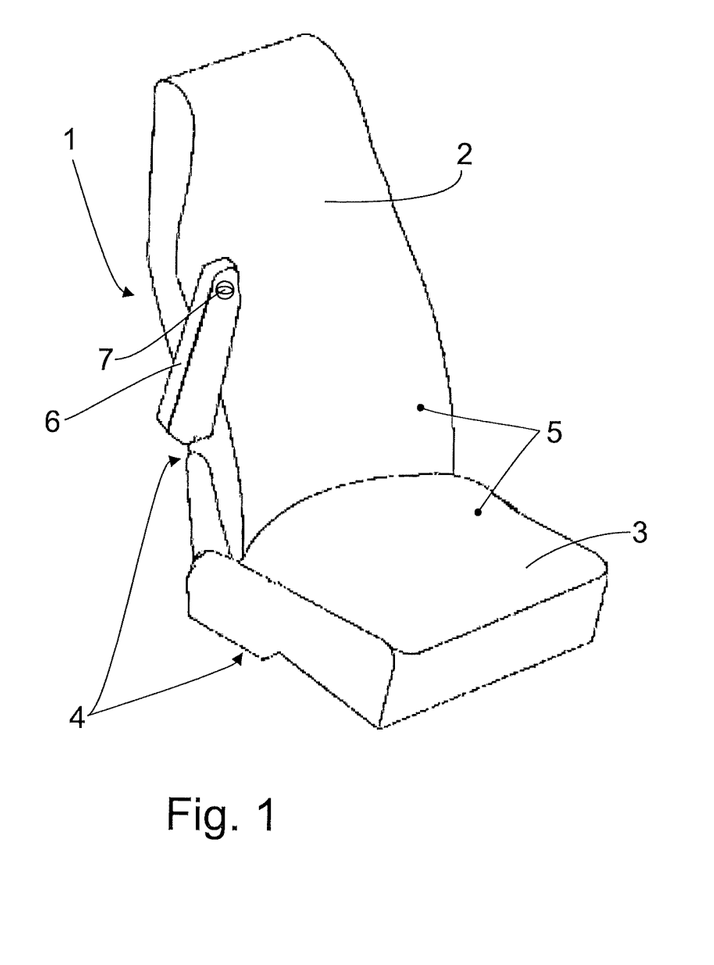
FIG. 1 is a schematic illustration of a motor vehicle seat with an armrest arrangement according to the invention.

An armrest arrangement 1 for a motor vehicle seat as per FIG. 1, in particular of a passenger motor vehicle, of a bus, of a minibus, of a ship or of an aircraft, has a dimensionally stable carrier structure 4. The carrier structure 4 may in particular be a metal structure. The motor vehicle seat comprises a seat surface 3, a backrest and an armrest body 6. The backrest 2 is pivotally connected to the seat surface 3, such that an angle of inclination of the backrest 2 relative to the seat surface 3 is adjustable. For this purpose, the carrier structure 4 is equipped with structural parts which are correspondingly movable relative to one another, which structural parts are each covered by a cushioning and a lining in order to form the seat surface and the backrest.

The carrier structure 4 of the backrest 2 comprises a pivot axle S which, in a side cheek region of the backrest 2—in the case of the motor vehicle seat being oriented in a vehicle longitudinal direction—runs in a vehicle transverse direction and about which the armrest body 6 is pivotable. The armrest body 6 comprises a housing which, in an armrest region, has a cushioning. On a side averted from the armrest surface, an actuating lever 8 for an inclination adjustment is arranged in a region in which it can be easily gripped by a user. By means of the arrangement of the actuating lever on a side facing toward the vehicle floor, it is made possible for a user to rest an arm on the armrest region of the armrest body 6 and use the hand of the resting arm in this position to operate the actuating lever 8 on the underside of the armrest body 6.

The carrier structure 4 of the seat surface 3 and the backrest 2 is covered by a cushioning, which in turn is covered by a lining 5. The pivotable armrest body 6 is pivotable between a functional position as per FIG. 4, in which the armrest body 6 is oriented approximately horizontally, and a non-use position as per FIG. 2, in which the armrest body 6 is oriented approximately parallel to the backrest 2.

Figure 3:
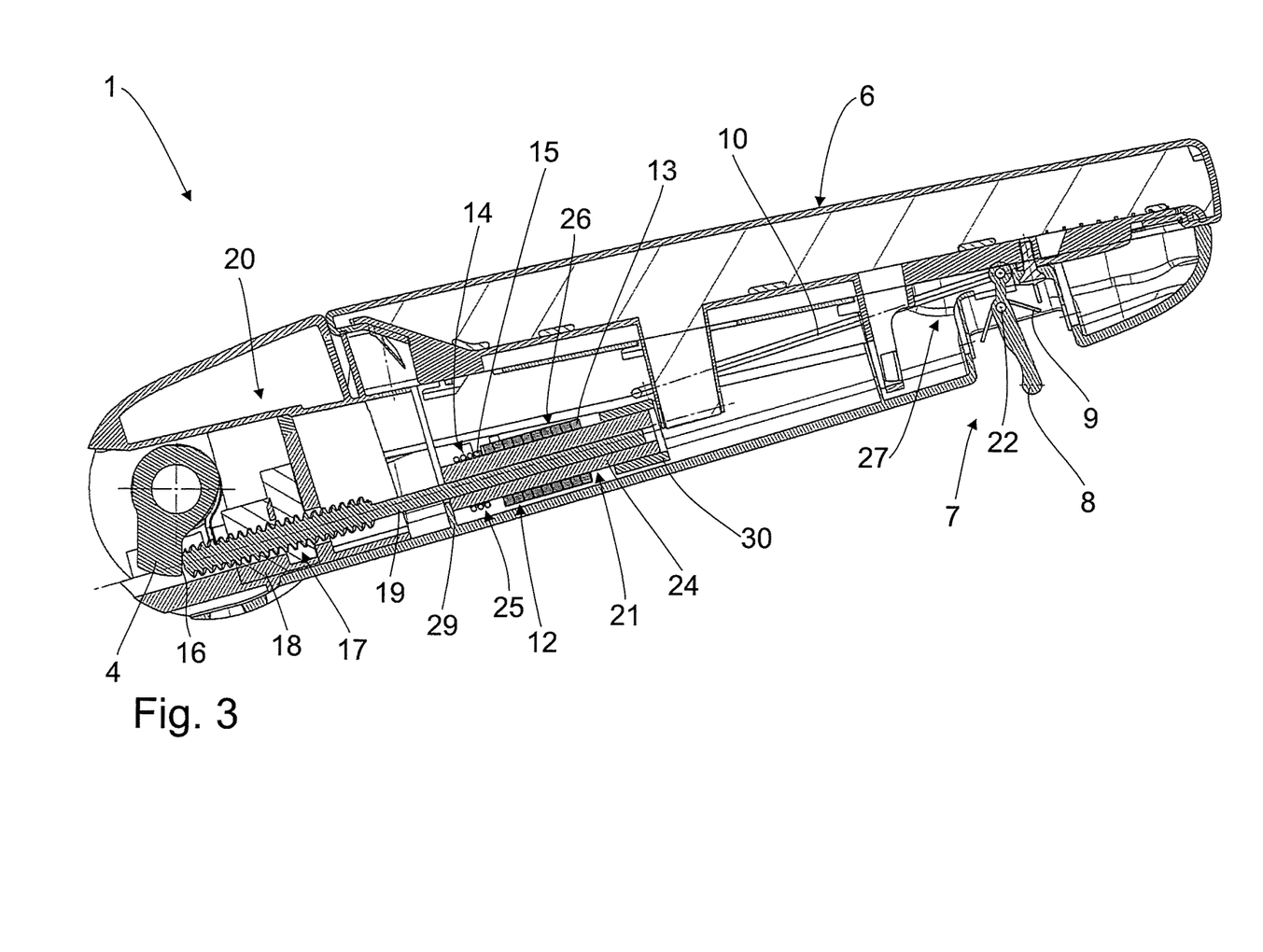
FIG. 3 is a further sectional illustration of the armrest arrangement shown in FIG. 2, in an intermediate position of the armrest body.

The armrest body 6 is adjustable in continuously variable fashion between the functional position and the non-use position, such that a user can set an intermediate position, which is comfortable for the user, of the armrest body 6. FIG. 3 illustrates a possible intermediate position of the armrest body 6.

The motor vehicle seat may comprise a single armrest arrangement 1, though it may also comprise a second armrest arrangement on a side of the backrest which is situated opposite a first armrest body 6, which second armrest arrangement is of mirror-symmetrical but otherwise identical design to the first armrest arrangement.

Figure 2:
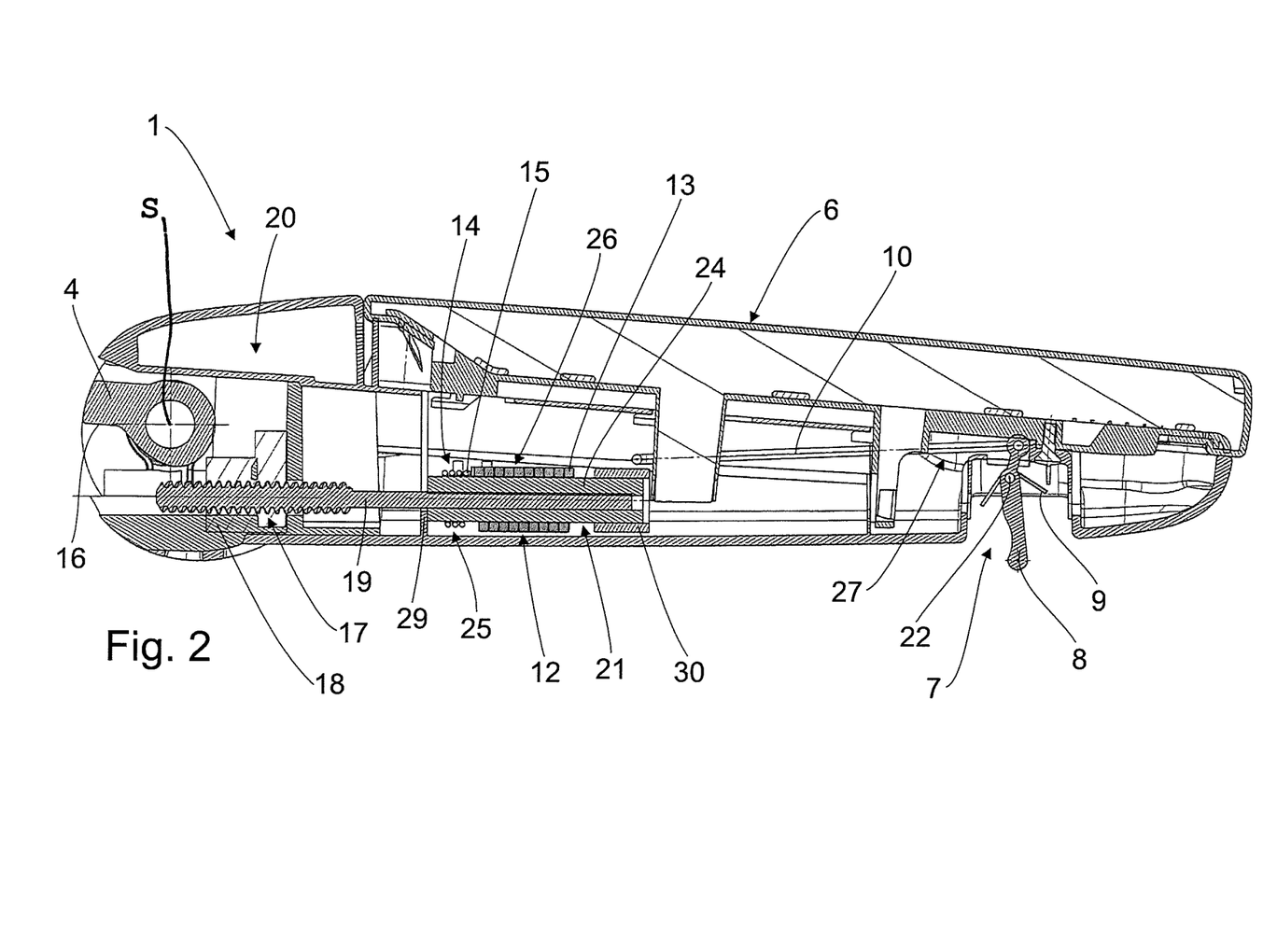
FIG. 2 is a sectional illustration of the armrest arrangement shown in FIG. 1 with an armrest body in a non-use position.

The armrest arrangement 1 is connected, as per FIG. 2, to the carrier structure 4 of the backrest 2 and has an inclination adjustment device 20 which comprises a support element 21, a guide 17 fixed to the armrest body, a blocking device 12, and an actuating element 7. These functional components are integrated in the armrest body 6. With the actuating element 7, the blocking device 12 can be blocked or released, whereby the support element 21 is blocked or released for a linear displacement relative to the guide 17. Between the guide 17 and a support point 16 of the carrier structure 4, there thus extends a displaceable length section of the support element 21, which defines the inclination setting of the armrest body 6. Here, if the length section of the support element 21 is relatively long, an angle between seat surface 3 and armrest body 6 is set to be relatively large. If the length section of the support element 21 is relatively short, a relatively small angle between armrest body 6 and seat surface 3 is set.

Figure 5:
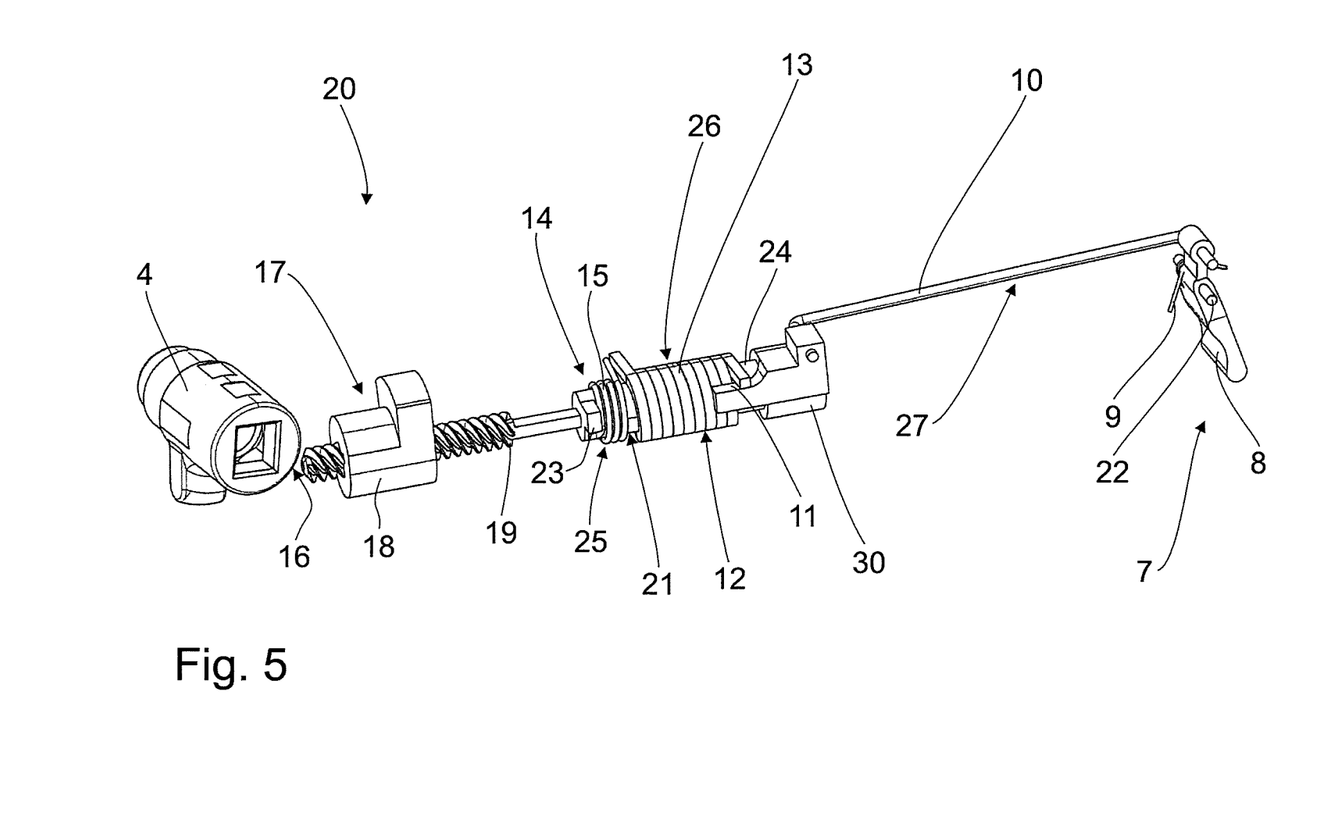
FIG. 5 is a three-dimensional illustration of functional components of an inclination adjustment device of the armrest arrangement.

A remote transmission device 27 comprises the actuating element 7 with an actuating lever 8 which, in a viewing plane of FIG. 5, is arranged in a lower region of the armrest body 6 and can be displaced by the user counter to a spring force of a leg spring 9. The actuating lever 8 is mounted on, and pivotable about, a bearing bolt 22 which is arranged transversely with respect to a direction of longitudinal extent of the armrest body 6.

When the actuating lever 8 is actuated by the user, a transmission rod 10 fastened to the actuating lever 8 is displaced linearly counter to the spring force of the leg spring 9. The transmission rod 10 is connected, in a region opposite the actuating lever 8 as per FIG. 5, to a wedge section 11. The wedge section 11 is formed as part of a sliding sleeve 30 which surrounds a region of the support element 21.

The support element 21 comprises a cylinder 24 and a threaded spindle 19, which comprises a threaded section and a threadless section. The cylinder 24 is rotatable and is secured against an axial displacement by an axial securing means 29, which is part of a housing of the armrest body 6. The threadless section of the threaded spindle 19 is of rotationally asymmetrical design. The cylinder 24 has a longitudinal bore which extends through the cylinder 24 and which corresponds to the threadless section of the threaded spindle 19. The threadless section of the threaded spindle 19 extends into the longitudinal bore of the cylinder 24. The threaded spindle 19 is thus connected rotationally conjointly to the cylinder 24 and is displaceable in a longitudinal direction in the rotatable cylinder 24, which is fixed axially to the housing. Thus, a rotation of the threaded spindle 19 relative to a spindle nut 18 connected to the housing can be compensated by the cylinder 24, and a longitudinal displacement of the threaded spindle 19 can be compensated by a relative movement of the threadless section of the threaded spindle 19 with respect to the longitudinal bore of the cylinder 24.

The rotation of the threaded spindle 19 can be blocked by a wrap brake 26 which comprises a wrap spring 13. The wedge section 11 of the sliding sleeve 30 has, as per FIG. 5, an oblique surface in a region averted from the transmission rod 10. The oblique surface engages under the final winding of the wrap spring 13. The wrap spring 13 surrounds a region of the cylinder 24 of the support element 21. For the sake of clarity, FIG. 5 does not illustrate that a winding of the region of the wrap spring 13 situated opposite the wedge section 11 is supported against the housing of the armrest body 6. The wrap spring 13 has an inner diameter selected such that, when said wrap spring is not actuated by the wedge section 11, said wrap spring fixedly clamps the cylinder 24 of the support element 21 such that said cylinder is neither rotatable nor linearly movable. The wrap spring 13 is produced from a wire with a rectangular cross section, in order to ensure a large clamping surface.

Likewise supported on the housing that is not illustrated in FIG. 5 is a winding end of a torsion spring 15. The torsion spring 15 functions here as a drive 14 and surrounds a region, facing toward the pivot axle S, of the cylinder 24 of the support element 21. The torsion spring 15 and the wrap spring 13 are wound in opposite directions. A final winding, averted from the pivot axle S, of the torsion spring 15 is supported on the housing of the armrest body 6. A final winding, facing toward the pivot axle S, of the torsion spring 15 is fastened to a radial projection 23 of the cylinder 24, such that the torsion spring 15 can be prestressed by the rotation of the cylinder 24. The cylinder 24 extends into the torsion spring 15, the wrap spring 13 and into the sliding sleeve 30.

The cylinder 24 is rotatable relative to the torsion spring 15, the wrap spring 13 and the sliding sleeve 30. The guide 17 fixed to the housing of the armrest body forms an internal thread, also referred to as a spindle nut 18, which is coordinated with an external thread of the threaded spindle 19. The threaded section of the threaded spindle 19 is rotatable in the spindle nut 18. Both threads are designed, with regard to their pitch, so as not to exhibit self-locking, such that an introduction of force by the user's arm resting on the armrest body 6 effects the rotation of the threaded spindle 19. The internal thread of the guide 17 and external thread of the spindle 19 accordingly form a movement thread. If the support element 21 is fixed by the blocking device 12, thread flanks of the threaded spindle 19 and of the spindle nut 18 are supported on one another, and there is thus positive locking in an adjustment direction of the support element by means of the thread flanks.

Figure 4:
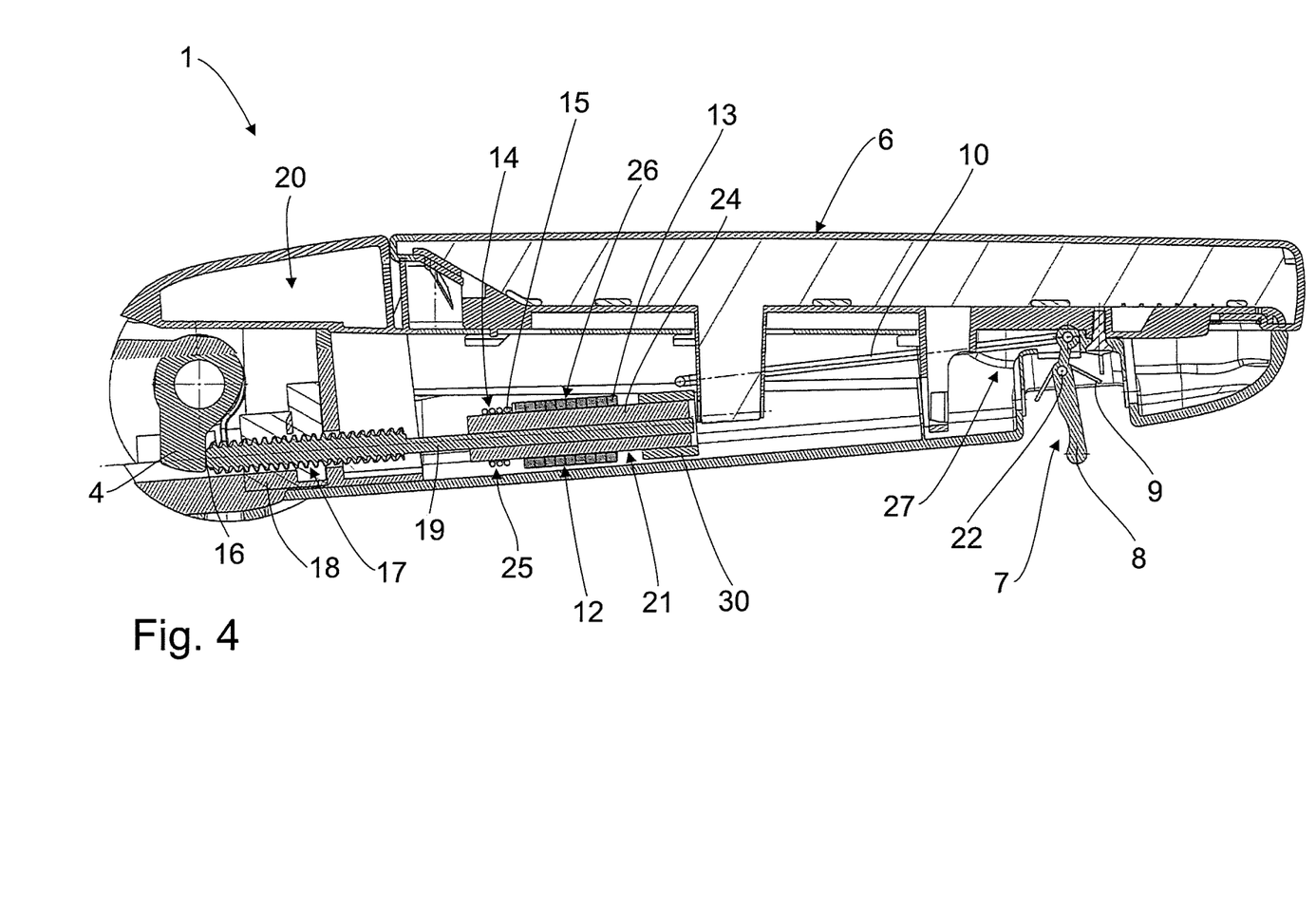
FIG. 4 is a further sectional illustration of the armrest arrangement shown in FIGS. 2 and 3, in an approximately horizontal functional position.

To adjust the inclination of the armrest body 6 relative to the seat surface 3, the user grips the actuating lever 8 and pulls it in a direction toward the right in a viewing plane of FIG. 4. Here, the leg spring 9, which is supported at one side on the housing and at the other side in the actuating lever 8, is prestressed. The actuating lever 8 rotates about the bearing bolt 22, wherein the transmission rod 10 is displaced to the left. The transmission rod 10 displaces the sliding sleeve 30 with the wedge section 11 likewise to the left.

Here, that winding of the wrap spring 13 which adjoins the sliding sleeve 30 is bent upward along the oblique surface of the wedge section 11, whereby the other windings are also expanded. By means of an enlargement of the cross section of the wrap spring 13, the blocking device 12 is then released, and the cylinder 24 is now rotatable within the wrap spring 13.

If the user then pushes the armrest body 6 downward, the threaded spindle 19 is pressed against the support point 16 of the carrier structure 4. The threaded spindle 19 is set in rotation relative to the spindle nut 18. Here, the length section of the threaded spindle 19 between the guide 17 and the support point 16 of the carrier structure 4 is shortened. The rotation and the longitudinal displacement of the threaded spindle 19 is compensated by a rotation of the cylinder 24 and a longitudinal displacement of the flattened section of the threaded spindle 19 in the cylinder 24. An inclination adjustment of the armrest body 6 is possible only for as long as the user actuates the actuating lever 8.

If the user releases the actuating lever 8, the actuating lever 8 is reset by the leg spring 9. The transmission rod 10 is displaced to the right, as is the wedge section 11. When the oblique surface of the wedge section 11 no longer acts on the winding of the wrap spring 13, the windings of the wrap spring 13 contract owing to the prestress thereof, and the cylinder 24 is clamped in the wrap spring 13. Thus, a rotation of the threaded spindle 19 is no longer possible, and the armrest body 6 is fixed.

To increase the angle of inclination between the seat surface 3 and the armrest body 6, the operating person pulls the operating lever 8 to the right, wherein the wedge section 11, as described above, releases the wrap spring 13. The prestressed torsion spring 15 is relieved of stress if no pressure is exerted on the armrest body 6 from above, wherein the armrest body 6 is pivoted upward.

The invention claimed is:

1. An armrest arrangement for a motor vehicle seat, said armrest arrangement comprising a carrier structure, an armrest body mounted so as to be pivotable relative to the carrier structure about a pivot axle, and an inclination adjustment device which, in a functional supporting position of the armrest body, permits a variation of an inclination of the armrest body relative to the carrier structure, the inclination adjustment device having a manually operable actuating element and blocking device for securing an inclination setting performed by the actuating element, the armrest body having a support element which is adjustable in a linearly movable fashion in a linear movement direction transverse to the pivot axle, the support element having an end supported on a support surface of the carrier structure in the functional supporting position of the armrest body, the carrier structure and the support surface thereof being positionally fixed and non-movable relative to the support element, the end of the support element being disposed to engage the support surface of the carrier structure along the linear movement direction of the support element in the functional supporting position of the armrest body, the actuating element and the blocking device being operatively connected to the support element such that the support element can, by the actuating element, be released for a linear adjustment and, by the blocking device, be locked in a set support position.

2. The armrest arrangement as claimed in claim 1, wherein the inclination adjustment device includes a guide non-movably fixed to the armrest body and the support element is held in a positively locking fashion in an adjustment direction by the guide.

3. The armrest arrangement as claimed in claim 2, wherein the support element is mounted for rotation relative to the armrest body and the guide, the support element and the guide being threadedly engaged with one another.

4. The armrest arrangement as claimed in claim 3, further including a drive configured to load the support element, the drive comprising a torsion spring which is arranged coaxially with respect to a movement thread defined in the guide, the torsion spring being supported at one side on the support element and at the other side on the guide.

5. The armrest arrangement as claimed in claim 1, further including a drive configured to load the support element in at least one adjustment direction.

6. The armrest arrangement as claimed in claim 5, wherein the drive comprises a mechanical spring drive.

7. The armrest arrangement as claimed in claim 1, wherein the blocking device comprises a wrap brake oriented coaxially with respect to the support element.

8. The armrest arrangement as claimed in claim 1, wherein the movement direction of the support element intersects the support surface of the carrier structure in the functional supporting position of the armrest body.

9. The armrest arrangement as claimed in claim 1, wherein the end of the support element is disposed in direct abutting engagement with the support surface of the carrier structure in the functional supporting position of the armrest body and exerts a force on the support surface primarily along the linear movement direction of the support element.

10. A motor vehicle seat having at least one armrest arrangement as claimed in claim 1.

11. An armrest arrangement for a motor vehicle seat comprising:
a carrier structure defining an axis and including thereon a support area;
an armrest body defining thereon a surface configured for supporting an arm of a user, said armrest body being mounted for pivotable movement relative to said carrier structure about the axis thereof between at least one raised non-use position wherein said surface of said armrest body is oriented at a first angle relative to the horizontal and at least one lowered use position wherein said surface of said armrest body is oriented at a second angle relative to the horizontal, said second angle being less than said first angle; and
an inclination adjustment arrangement configured to permit variation of a position of said armrest body relative to said carrier structure, said inclination adjustment arrangement comprising:
a support element mounted on said armrest body for linear movement along a direction transverse to the axis of said carrier structure, said support element having a first end disposed adjacent said carrier structure and a second end spaced from said first end;
a blocking device operatively connected to said support element; and
a manually operable actuating element disposed on said armrest body and operatively connected to said blocking device, said actuating element having a first position in which said blocking device is disposed to prevent linear movement of said support element and lock same in a fixed position relative to said armrest body, and a second position in which said support element is linearly movable relative to said armrest body to permit selective adjustment of a position of said armrest body relative to said carrier structure, said carrier structure and said support area thereof being fixed in position and non-movable relative to said support element, said first end of said support element being disposed to engage said support area of said carrier structure and exert a force thereon primarily along the direction of linear movement in the lowered use position of said armrest body.

12. The armrest arrangement as claimed in claim 11, wherein the direction of linear movement of said support element intersects said support area of said carrier structure in the lowered use position of said armrest body.

13. The armrest arrangement as claimed in claim 12, wherein said first end of said support element is disposed in direct contact with said support area of said carrier structure in the lowered use position of said armrest body.

14. The armrest arrangement as claimed in claim 11, wherein said inclination adjustment arrangement further comprises a guide element non-movably fixed to said armrest body and disposed to supportively engage said support element during linear displacement thereof, said first end of said support element having a section extending between said guide element and said support area of said carrier structure in the lowered use position of said armrest body, wherein a length of said section extending between said guide element and said support area is variable through linear displacement of said support element relative to said guide element to permit selective adjustment of a position of said armrest body relative to said carrier structure.

15. The armrest arrangement as claimed in claim 11, wherein said support element is mounted on said armrest body for rotational movement relative to said carrier structure about a rotational axis coextensive with the direction of linear movement of said support element.

16. The armrest arrangement as claimed in claim 11, wherein said support element is mounted on said armrest body for both linear movement along the direction transverse to the axis of said carrier structure and rotational movement about an axis transverse to the axis of said carrier structure.

17. The armrest arrangement as claimed in claim 11, wherein said support element is mounted on said armrest body for rotational movement about an axis transverse to the axis of said carrier structure, and said inclination adjustment arrangement further comprises a guide element non-movably fixed to said armrest body, said support element and said guide element threadingly engaging one another to permit rotational movement of said support element relative to said guide element.

18. The armrest arrangement as claimed in claim 17, wherein said first end of said support element has a section extending between said guide element and said support area of said carrier structure in said lowered use position of said armrest body, and a length of said section extending between said guide element and said support area is variable through linear displacement of said support element relative to said guide element to permit selective adjustment of a position of said armrest body relative to said carrier structure.

19. The armrest arrangement as claimed in claim 18, wherein said inclination adjustment arrangement comprises a sleeve, said support element comprises a spindle having a first threaded portion threadingly engaged with a threaded portion of said guide element, a second non-threaded portion connected to said first threaded portion for movement therewith and disposed within and connected to said sleeve for rotation therewith, said first threaded portion being disposed between said first end of said support element and said second non-threaded portion, and said blocking device comprises a brake disposed to cooperate with said sleeve to prevent rotation of said sleeve and said spindle in said first position of said actuating element.

* * * * *